(12) United States Patent
Xue et al.

(10) Patent No.: US 9,218,825 B2
(45) Date of Patent: Dec. 22, 2015

(54) T-SHAPED WRITE POLE

(71) Applicant: Seagate Technology LLC, Cupertino, CA (US)

(72) Inventors: Jianhua Xue, Maple Grove, MN (US); Zhe Shen, Lakeville, MN (US); Christopher James Rea, Edina, MN (US); Eric Roger Meloche, Burnsville, MN (US); Huaqing Yin, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 27 days.

(21) Appl. No.: 14/052,337

(22) Filed: Oct. 11, 2013

(65) Prior Publication Data

US 2015/0103445 A1    Apr. 16, 2015

(51) Int. Cl.
G11B 5/127 (2006.01)
G11B 5/187 (2006.01)
G11B 5/31 (2006.01)
G11B 5/11 (2006.01)
G11B 5/60 (2006.01)

(52) U.S. Cl.
CPC ............ G11B 5/1278 (2013.01); G11B 5/1871 (2013.01); G11B 5/315 (2013.01); G11B 5/3116 (2013.01); G11B 5/3163 (2013.01); G11B 5/11 (2013.01); G11B 5/6082 (2013.01)

(58) Field of Classification Search
CPC ........... G11B 5/60; G11B 5/6082; G11B 5/11
USPC ....................................... 360/125.13, 125.12
See application file for complete search history.

(56) References Cited

U.S. PATENT DOCUMENTS

| | | | |
|---|---|---|---|
| 6,252,748 B1 | 6/2001 | Yamanaka et al. | |
| 6,504,675 B1 * | 1/2003 | Shukh et al. | ............. 360/125.12 |
| 6,564,445 B1 * | 5/2003 | Hashimoto et al. | ........ 29/603.14 |
| 6,700,739 B2 | 3/2004 | Kim et al. | |
| 7,116,517 B1 | 10/2006 | He et al. | |
| 8,233,233 B1 | 7/2012 | Shen et al. | |
| 8,264,798 B1 | 9/2012 | Guan et al. | |
| 8,270,109 B2 * | 9/2012 | Ohtsu | ....................... 360/125.03 |
| 8,289,647 B2 | 10/2012 | Benakli et al. | |
| 8,625,234 B2 * | 1/2014 | Guan et al. | ................ 360/125.13 |
| 8,830,626 B2 * | 9/2014 | Heim et al. | ................. 360/125.3 |
| 2004/0027729 A1 * | 2/2004 | Lo et al. | ......................... 360/317 |
| 2004/0264046 A1 * | 12/2004 | Hsiao et al. | .................... 360/126 |
| 2009/0268344 A1 | 10/2009 | Guan et al. | |
| 2009/0290257 A1 * | 11/2009 | Kimura et al. | ........... 360/125.13 |
| 2011/0205671 A1 | 8/2011 | Benakli et al. | |
| 2013/0016442 A1 | 1/2013 | Benakli et al. | |

* cited by examiner

Primary Examiner — Allen T Cao
(74) Attorney, Agent, or Firm — Hall Estill Attorneys at Law

(57) ABSTRACT

A magnetic element may be generally configured with at least a write pole that has leading and trailing regions on an air bearing surface. The leading region may have a trailing width connected to a leading width of the trailing region via a transition feature to form a substantially T-shaped cross-section on the air bearing surface.

20 Claims, 4 Drawing Sheets

T-SHAPED WRITE POLE

SUMMARY

The various embodiments generally relate to a magnetic element capable of programming data bits in an unlimited variety of data storage environments.

Assorted embodiments are directed to a write pole that has leading and trailing regions on an air bearing surface. The leading region may have a trailing width connected to a leading width of the trailing region via a transition feature to form a substantially T-shaped cross-section on the air bearing surface.

DETAILED DESCRIPTION

Progression of data storage devices has seen increased data capacity and faster data access speeds in reduced form factors. However, smaller data accessing components can increase the risk of data access errors that can jeopardize the integrity of existing data as well as the speed at which data is read and written. For example, a perpendicular magnetic recording (PMR) data writer may have a structure that produces a magnetic field that spans multiple data bits and inadvertently modifies the programmed magnetic polarity of a data bit proximal a selected data bit due to increased data bit areal density. Hence, industry has strived for more reliable small form factor data storage components that can operate in high areal density environments with reduced risk of inadvertent magnetic modification of proximal data bits.

With these issues in mind, a data writing element can be configured with at least a write pole having leading and trailing regions on an air bearing surface with the leading region having a trailing width connected to a leading width of the trailing region via a transition feature to form a substantially T-shaped cross-section on the air bearing surface. The ability to tune the transition feature, trailing region, and leading region can optimize the magnetic extent of the write pole to reduce the modification of proximal data bits. Additionally, the tuned transition feature and various pole regions can enhance magnetization relaxation in the write pole, which can increase data bit programming reliability and bit access speeds. These tuned optimizations are particularly interesting due to their versatility that can accommodate reduced form factor data storage environments.

Figure 1:
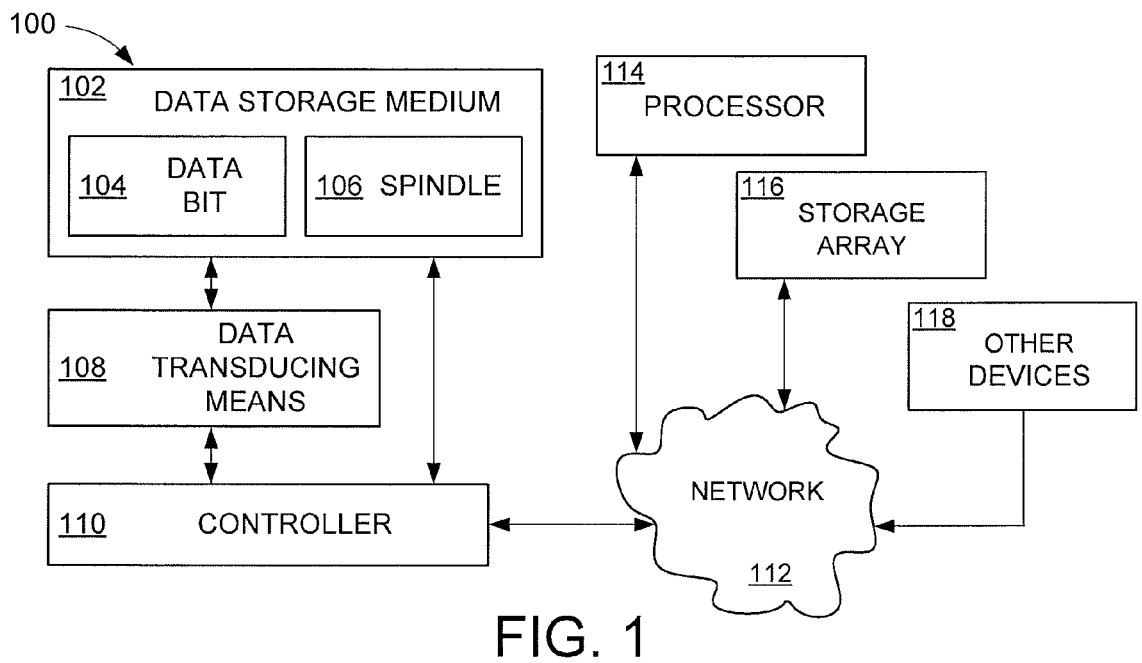
FIG. 1 is a block representation of an example data storage environment in which various embodiments can be operated.

FIG. 1 provides a block representation of an example data storage environment 100 in which a tuned write pole may be practiced in accordance with various embodiments. The data storage environment 100 is not limited to a particular location, size, and capability, but can be configured with at least one data storage medium 102 storing one or more data bits 104 in a predetermined pattern, such as a bit patterned media and concentric data tracks. The data storage medium 102 can be selectively rotated by a spindle motor 106 that produces an air bearing on which data transducing means 108, such as a magnetoresistive sensor and perpendicular data recorder, fly and access data bits 104.

One or more local controllers 110 can communicate with the data transducing means 108 and spindle 106 to dictate how, when, and where data are to be translated to and from the data storage medium 102. It is contemplated that a plurality of data storage media are engaged by a common spindle 106 and separate data transducing means 108 as part of a hard drive stack, however such embodiment is not required or limiting. Through choreographed movement dictated by the controller 110, data can be read from and programmed to the data storage medium 102 as well as to local temporary data storage like DRAM, Flash, and other rotating data storage means.

While data can stream into and out of the data storage medium 102 due solely to local controllers 110, assorted embodiments connect the local controller 110 to other computing means via a wired and wireless network 112 and appropriate protocol. The ability to access the network 112 can allow a nearly endless multitude of computing capabilities to be partially or wholly accessed to operate the data storage medium 102. As a non-limiting example, the local controller 110 can utilize one or more remote processors 114, data storage arrays 116, and other computing devices 118 to compute and control the flow of data to and from the data storage medium 102. These remote capabilities allow the temporary and permanent use of the computing means via the network 112 to increase computing power, storage capacity, and data reliability, such as through a redundant array of independent disks (RAID) configuration.

Figure 2:
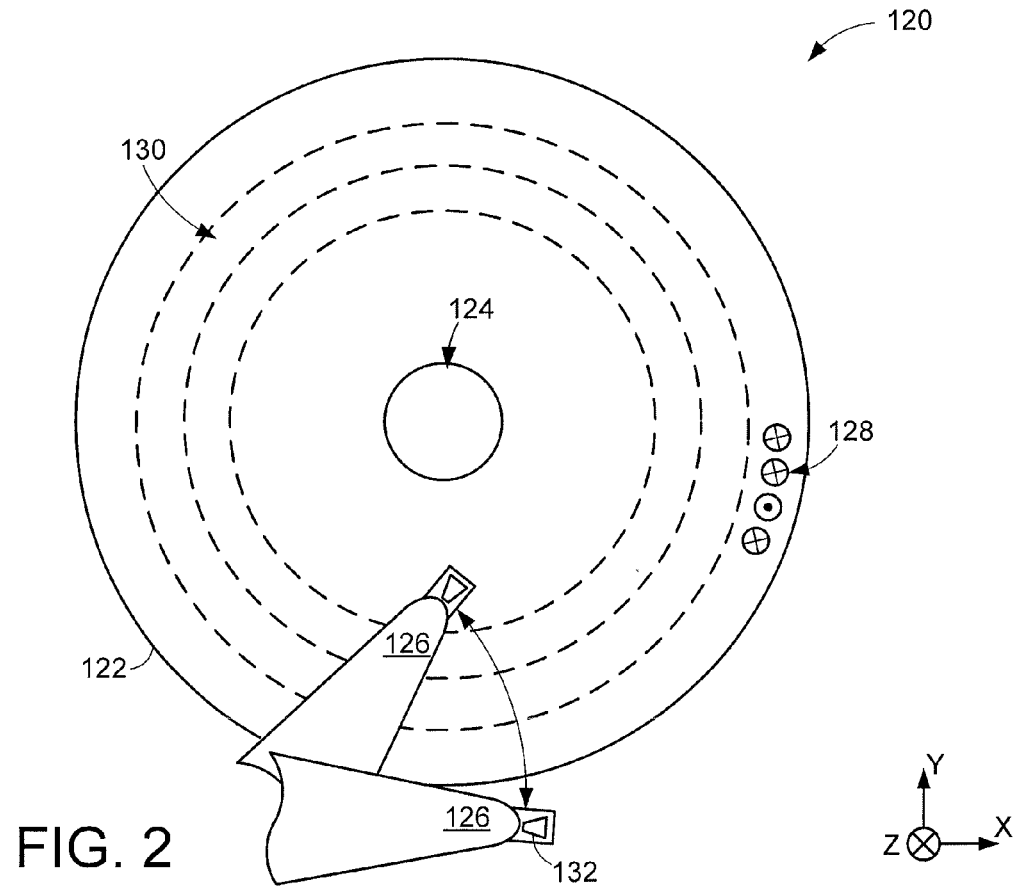
FIG. 2 illustrates a top view block representation of a portion of an example data storage system capable of being used in the data storage environment of FIG. 1.

FIG. 2 illustrates a top view block representation of a portion of an example data storage system 120 capable of being used in the data storage environment 100 of FIG. 1 in accordance with some embodiments. The data storage system 120 has a circular data storage medium 122 attached to and controlled by a central spindle motor 124. Rotation of the data storage medium 122 can produce an air bearing on which an actuating assembly 126 floats to access data bits 128 that are positioned in predetermined data tracks 130. To write data to a selected portion of the data storage medium 122, a write pole 132 portion of the actuating assembly 126 can emit magnetic flux to form a magnetic circuit through the medium 122 and back to a return pole portion (not shown) of the actuating assembly 126.

Access to the various data bits 128 and data tracks 130 throughout the medium 122 can be facilitated by rotation of the actuating assembly 126, as shown. However, rotation of the actuating assembly 126 can correspond with the write pole 132 tilting in relation to the data tracks 130. While the write pole 132 can be shaped, such as in a trapezoidal configuration, to reduce concurrent overlap of multiple data tracks 130, an increase in the number of data tracks 130 can accentuate reduced physical dimensions to make containing the magnetic extent of the write pole 132 to a single data track 130 difficult.

Such write pole 132 tilting in combination with reduced write pole dimensions and data track 130 spacing can suffer from magnetization relaxation and cross-track magnetic field gradient that increases the risk for erasure after writing (EAW) due to the write pole 132 inadvertently emitting magnetic flux after a programming operation and adjacent track interaction (ATI) as the magnetic extent of the write pole 132 overlaps portions of data tracks 130 adjacent to a selected data track 130. The use of data track overlapping magnetic extent can be utilized in some data storage schemes like shingled magnetic recording, but the increased data access complexity and time can mitigate the capabilities of shingled data schemes. Specifically, a data bit 128 may be programmed with magnetic flux from the outer edge of the magnetic extent of the write pole 132, which corresponds with large magnetic transition curvature and poor downtrack magnetic field gradient compared to the middle of the pole's magnetic extent along with degraded signal-to-noise ratio and bit error rate for the data storage system 120.

Figure 3:
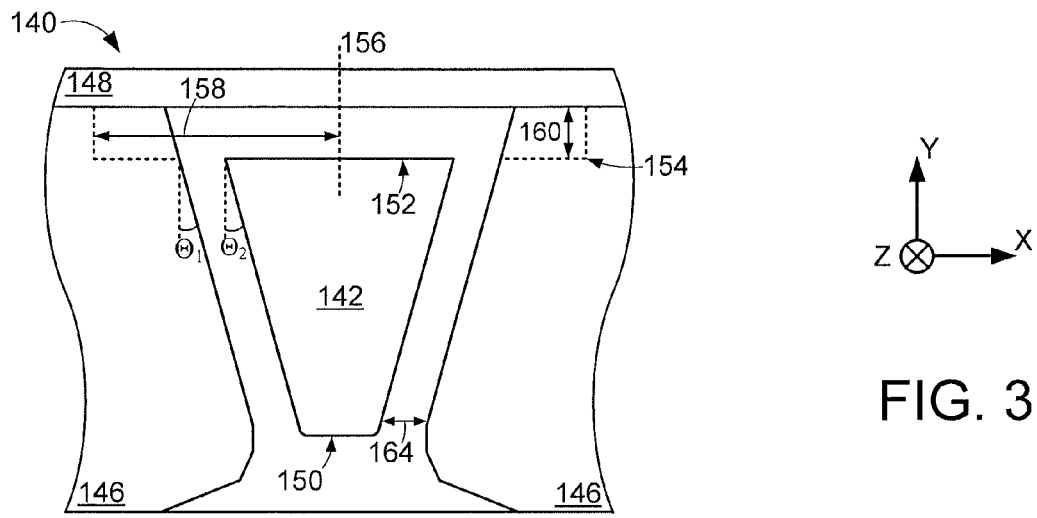
FIG. 3 shows an ABS view block representation of a portion of an example magnetic element constructed in accordance with some embodiments.

FIG. 3 illustrates an air bearing surface (ABS) view block representation of a portion of a data storage device 140 constructed and operated in accordance with various embodiments to control the magnetic extent of a write pole 142. Positioning low magnetic coercivity shields proximal the write pole 142 can control where and how magnetic flux is emitted from the write pole 142 to program data bits across the ABS. In yet, reduced dimensions of the trailing 144 and side 146 shields along with minimal gap distance 148 between the write pole 142 and side shields 146 can correspond with magnetic shunting that degrades device 140 performance.

Thus, there is a tuned balance in the shape, size, and position of magnetic shields 144 and 146 to control the magnetic extent where magnetic flux is emitted from the write pole 142 while minimizing magnetic shunting between the shields and write pole 142. Assorted embodiments configure the side shields 146 to have a varying gap distance 148 from the write pole 142, such as being closer at the leading edge 150 of the write pole 142 than at the trailing edge 152, which is facilitated by differing the shield $\theta_1$ and pole $\theta_2$ sidewall angles with respect to the Y axis. Other embodiments configure the sidewall angles $\theta_1$ and $\theta_2$ to be substantially the same while removing downtrack portions of the side shields 146 to form a letterbox area 154 of non-magnetic material between the side 146 and trailing 144 shields.

The letterbox area 154 can be tuned to be symmetric or non-symmetric about the Y axis and longitudinal axis 156 of the write pole 142. For example, the letterbox width 158 from the longitudinal axis 156 and height 160 of the letterbox 154 can be tuned to control how the trailing edge 152 of the write pole 142 is shielded. It should be noted that the leading 150 and trailing 152 nomenclature is not limiting but corresponds to the sequence in which the write pole 142 passes over a data bit as well as the location of the various write pole 142 portions in relation to a rotating data track, such as track 130 of FIG. 2. Hence, the uptrack, leading edge 150 of the write pole 142 can employ different shielding characteristics than the downtrack, trailing edge 152 thanks to the tuned letterbox area 154 and sidewall angles $\theta_1$ and $\theta_2$.

Figure 4:
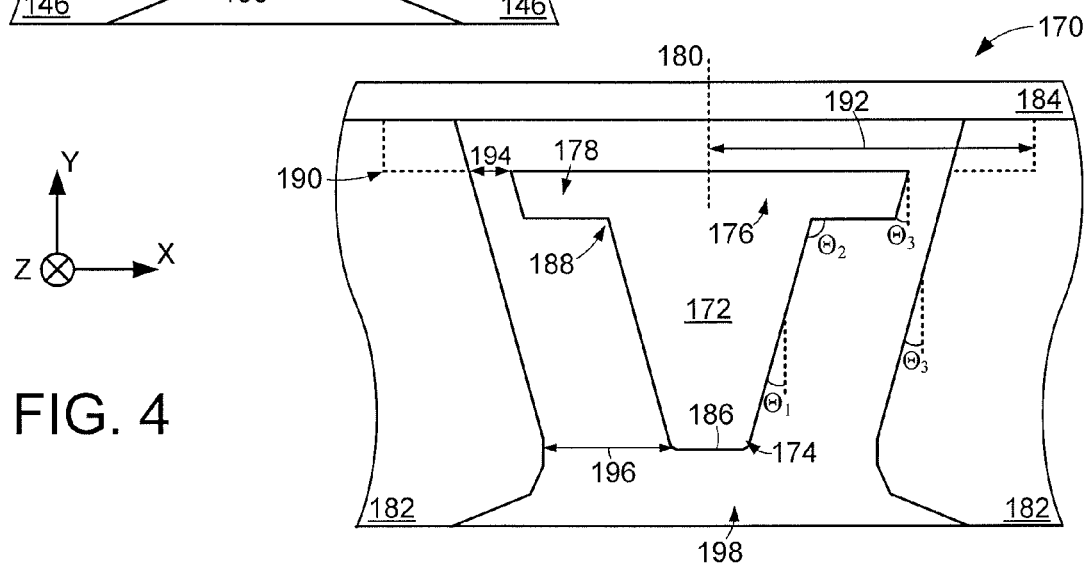
FIG. 4 displays an ABS view block representation of an example magnetic element constructed in accordance with various embodiments.

The ability to tune the side 146 and trailing 144 shields for size, shape, and position is not limited by the shape, size, and material of the write pole 142. As such, the shields can be tuned in combination with a write pole tuned for shape and size to control the magnetic extent of a data bit writing element and mitigate EAW and ATI. FIG. 4 displays an ABS view block representation of an example writing element 170 configured in accordance with assorted embodiments to employ tuned magnetic shields and a write pole 172. As shown, the write pole 172 is tuned for shape and size defined by a leading region 174 that continuously extends into the trailing region 176 that has projections 178 symmetrically extending along the X axis and cross-track direction at the ABS from the longitudinal axis 180 of the write pole 172.

It can be appreciated that the combination of the leading 174 and trailing 176 regions of the write pole 172 conveys a substantially T-shape that can control how and where magnetic flux is emitted from the write pole 172 as well as how the write pole 172 interacts with the side 182 and trailing 184 shields. The tuned leading region 174 can have one or more sidewalls tapered at a predetermined angle $\theta_1$ so that the leading edge 186 has a smaller width along the X axis and cross-track direction on the ABS than the trailing region 176. The tapered sidewall can connect to the trailing region 178 via a transition feature 188 that can be configured in an unlimited variety of curvilinear and linear surfaces, but in some embodiments is an oblique angle $\theta_2$ at the contact of the tapered sidewall from the leading region 174 and the leading edge of the trailing region 176.

By tuning the sidewall taper angle $\theta_1$ in relation to the side shield sidewall taper angle $\theta_2$ along with the tuned projections 178, magnetic flux can be distributed from the write pole 172 towards the trailing shield 184, which can reduce the magnetic field transition curvature and variation of on-track magnetic gradient in the cross-track direction. That is, the tuned configuration of the leading region 174 and projections 178 of the trailing region 176 can aid magnetic flux in flowing towards the trailing shield 184 along the Y axis to optimize magnetic transitions in the write pole 172 as magnetic flux is less prone to remain at the ABS after a data programming operation. The tuned write pole 172 may be complemented by configuring a letterbox area 190 proximal the trailing region 176 and with a predetermined width 192 from the longitudinal axis 180 to promote magnetic flux flowing to the trailing shield 184 and not the side shields 182.

Regardless of the presence of a letterbox area 190, various embodiments tune the side shields 182 to each be separated from the trailing edge of the trailing region 176 by a trailing distance 194 that is less than a leading distance 196 from each side shield 182 to the leading edge 186. The closer proximity of the side shields 182 to the trailing region 176 than the leading region 174 can provide a balance between shielding and shunting magnetic flux to define a magnetic extent that fits a reduced data track width while minimizing magnetic flux transmission to the side shields 182, which can lead to ATI and EAW. It should be noted that the writing element 170 has a non-magnetic throat region 198 uptrack from the write pole 172 that has an increasing width between the side shields 182 moving along the Y axis. However, such non-magnetic throat region 198 is not required or limiting as a leading shield may fill part or all of the area uptrack from the write pole 172.

Figure 5:
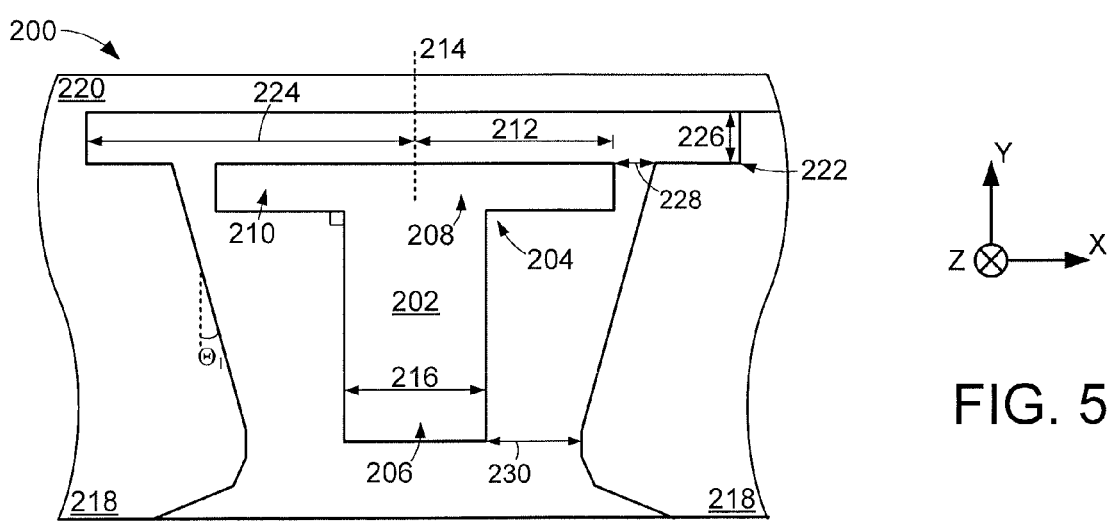
FIG. 5 illustrates an ABS view block representation of a portion of an example magnetic element constructed in accordance with various embodiments.

The substantially T-shape of the write pole 172 is not limited to the construction shown in FIG. 4 as an unlimited variety of different sidewall angles, surfaces, and surfaces can provide a T-shape to control magnetic flux and data bit programming operations. FIG. 5 is an ABS view block representation of an example data writer 200 constructed and operated in accordance with various embodiments to have a write pole 202 with a right angle transition feature 204 that connects linear sidewalls of the leading 206 and trailing 208 regions of the pole 202. The trailing region 208 comprises laterally extending projections 210 that are cantilevered from the leading region 206 with a predetermined projection width 212 from the longitudinal axis 214 of the write pole 202, which is aligned with the Y axis.

In comparison with the tapered sidewalls of the leading region 174 of FIG. 4, aligning the sidewalls of the leading region 206 with the Y and longitudinal axis 214 can provide a different shape anisotropy for the write pole 202 as a whole. The shape anisotropy of the write pole 202 can contribute to the magnetic performance of the data writer 200 by controlling the Z and X axis magnetization movement. The ability to tune the shape of the leading 206 and trailing 208 regions can allow the shape anisotropy of the write pole 202 at the trailing edge of the trailing region 208 to be decreased and magnetization can be more easily relax to alignment along the cross-track and X axis after a data writing operation and relax to a decreased energy state. Such relaxation can reduce the risk of magnetization getting trapped in local domain states at the ABS during and after a data programming operation, which can correspond to unwanted EAW and ATI conditions.

With the correlation of the shape of the write pole 202 with magnetic anisotropy and reduced EAW and ATI conditions, it can be appreciated that the tuned size and shape of the leading 206 and trailing 208 regions can optimize data writer 200 performance. The non-limiting embodiment shown in FIG. 5 illustrates how a substantially rectangular leading region 206 with sidewalls angled differently than the side shield 218 sidewall angle $\theta_1$ can have a leading width 216 that is a predetermined ratio to the projection width 212, such as 1:2, 3:4, and 1:4 to provide a shape anisotropy that promotes uniform downtrack gradient at different locations about the magnetic extent of the pole 202 along the cross-track direction and the flow of magnetic flux towards the trailing region 208 and trailing shield 220. That is, the leading 216 and projection 212 widths can be tuned with respect to each other to produce different cross-track and downtrack gradients, or along the X and Y axis respectively, to control the magnetic flux distribution so that the leading region 206 has a substantially uniform magnetization laterally and an increasing downtrack gradient and towards the trailing shield 220, which can favor magnetic transition quality in the media and optimize PW50 while reducing magnetic jitter.

While not required or limiting, the data writer 200 can be configured with a letterbox area 222 on one, or both, lateral sides of the write pole 202. The letterbox area 222 can be a removal of magnetic shielding material in the side shields 218 and/or the trailing shield 220 to define a letterbox width 224 from the longitudinal axis 214, a letterbox length 226, and a trailing separation distance 228 between the trailing region 208 and the side shield 218. The letterbox area 222 can be filled with non-magnetic and magnetic material to further provide a balance between magnetic shielding of and shunting with the write pole 202.

In some embodiments, the letterbox area 222 is configured to extend from the trailing edge of the write pole 202 and promote the shunting of residual magnetic flux to the trailing shield 220. Stated another way, the side 218 and trailing 220 shields can be constructed to reduce shunting during data writing operations and promote shunting to the trailing shield 220 immediately after a data writing operation, as illustrated by the difference in separation distances 228 and 230 between the write pole 202 and side shields 218. Such control of the magnetization switching can allow the write pole 202 to quickly relax from the emission of magnetic flux, which in combination with the tuned shield shapes can decrease the risk of EAW and ATI.

The optimized control of magnetization within the write pole 202 via the tuned shape of the leading 206 and trailing 208 regions can provide a reduced magnetic transition curvature, especially near the track edge about the trailing region 208. Furthermore, tuning the leading 206 and trailing 208 regions can control the magnetic extent of the write pole 202 that corresponds with the scope of magnetic flux emission during data writing operations.

Figure 6:
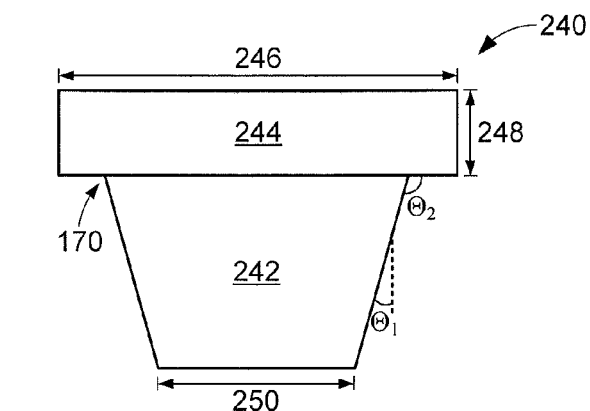
FIG. 6 is an ABS view block representation of a portion of an example magnetic element constructed in accordance with some embodiments.

FIG. 6 displays an ABS view block representation of an example write pole 240 constructed with leading 242 and trailing 244 regions of differing materials in accordance with various embodiments to tune the size and position of the magnetic extent of the write pole 240. Tuning the width 246 and length 248 of the trailing region 244 can provide shape anisotropy that operates in concert with a relatively small separation distance between the side shield and write pole 240 to maintain write field integrity and reduce inadvertent magnetic shunting.

Assorted embodiments construct the trailing region 244 of a higher magnetic moment ($B_s$) material than the leading region 242 to tune and narrow the magnetic extent erasure band of the write pole 240 while promoting magnetization flow towards the trailing edge of the write pole 240. The magnetic moment material of the leading 242 and trailing 244 regions can be tuned with respect to the shape of the respective leading 242 and trailing 244 regions to control the size and position of the erasure band of the write pole 240. It should be noted that the erasure band of the write pole 240 can be defined as an outer ring of magnetic extent that may have a reduced magnetic strength compared to an inner ring, but has a strength that can program data bits lying underneath the erasure band.

In the example write pole 240 configuration of FIG. 6, the leading region 242 has an enlarged leading edge width 250 on the ABS that corresponds with a greater trailing edge of the leading region 242 and a transition feature 252 that extends into a shortened projection length compared to the example write pole projections of FIGS. 4 and 5. The larger surface area of the leading region 242 can increase tuned for taper angle $\theta_1$ and transition feature angle $\theta_2$ to increase manufacturing accuracy, particularly in aligning the different materials of the leading 242 and trailing 244, which can be difficult with nanometer scale write pole dimensions.

Figure 7:
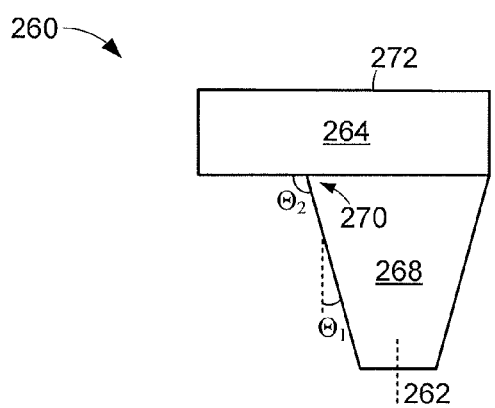
FIG. 7 shows an ABS view block representation of a portion of an example magnetic element constructed in accordance with various embodiments.

The ability to tune the magnetic performance of the write pole 240 by adjusting the size, shape, and material of the leading 242 and trailing 244 regions can allow the write pole 240 to accommodate a diverse variety of data storage schemes and environments like shingled magnetic recording and high areal density rotating media. FIG. 7 illustrates an ABS view block representation of an example write pole 260 configured in accordance with various embodiments to have an asymmetric orientation about a longitudinal axis 262 and the Y axis on the ABS. The asymmetry of the write pole 260 provided by constructing a trailing region 264 with a single lateral projection 266, as opposed to the symmetrical projections shown in FIGS. 5 and 6 that extend in opposite lateral directions along the X axis, can decrease magnetic flux leakage and shunting to a selected side of the write pole 260 by increasing the separation distance between the trailing region 264 and a side shield.

The asymmetrical write pole 260 configuration between the leading 268 and trailing 264 regions can have a single transition feature 270 that can range from 90° to 179° to control shape anisotropy throughout the write pole 260 and the flow of magnetic flux towards the trailing edge 272. In some embodiments, the leading region sidewalls are tapered at an angle $\theta_1$ that is a predetermined factor of the transition feature angle $\theta_2$, such as 1:3, 1:4, and 1:5, while other embodiments form the transition feature as a right angle and the leading region 268 sidewalls as vertically aligned with the Y axis, as shown in FIG. 5.

Figure 8:
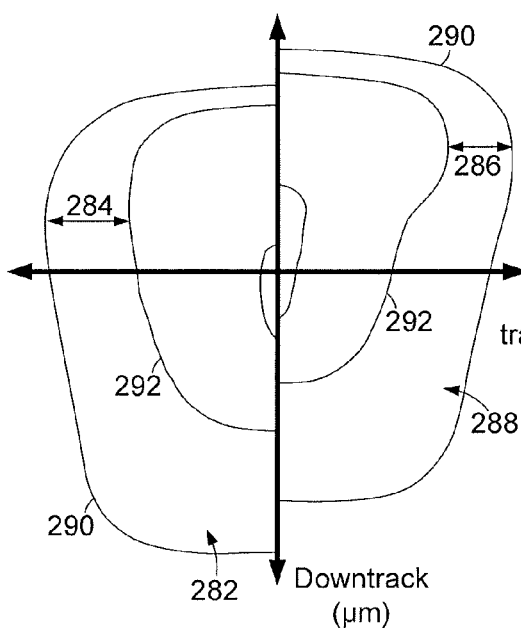
FIG. 8 plots operational data from an example data writing element configured and operated in accordance with assorted embodiments.

With the various tuning options with a write pole configured in accordance with assorted embodiments, the erasure band and magnetic wall angle can be optimized. FIG. 8 plots the effective magnetic field for differently tuned write poles that conform with various embodiments. The left half of the plot corresponds with a single material, trapezoidal shaped write pole while the right half of the plot corresponds with a T-shaped write pole that may or may not have multiple different magnetic moment materials. As shown, the erasure band 282 of the trapezoidal write pole has a greater width 284 in the cross-track direction than the T-shaped pole width 286 of erasure band 288. It can be appreciated that the tuned leading and trailing regions of a T-shaped write pole can translate the 10 kOe magnetic extent bubble 290 and 5 kOe magnetic extent bubble 292 uptrack while reducing the erasure band width, such as from 29 nm to 23 nm.

Figure 9:
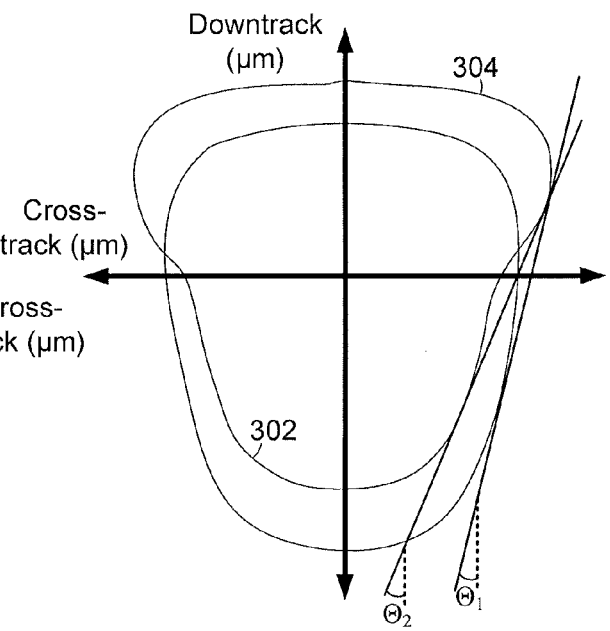
FIG. 9 displays operational data from an example data writing element configured and operated in accordance with various embodiments.

The comparison of a trapezoidal write pole to a tuned T-shaped write pole continues in the example operational data plot of FIG. 9, which displays complete trapezoidal 302 and T-shaped 304 magnetic extent write bubbles respectively. The larger lateral width of the trailing region in a T-shaped write pole corresponds with a shape anisotropy that increases the magnetic field at the trailing edge while decreasing the magnetic field at the leading edge to produce a magnetic wall 306 having a greater angle $\theta_1$ with respect to the Y and longitudinal axis than the trapezoidal magnetic wall 308 angle $\theta_2$. The increased magnetic wall angle can be adjusted by tuning the size and position of the leading and trailing regions of the T-shaped write pole to allow the write pole to more accurately fit within reduced width data tracks despite varying skew angle across a data storage medium, as illustrated by actuating assembly 126 of FIG. 2.

Figure 10:
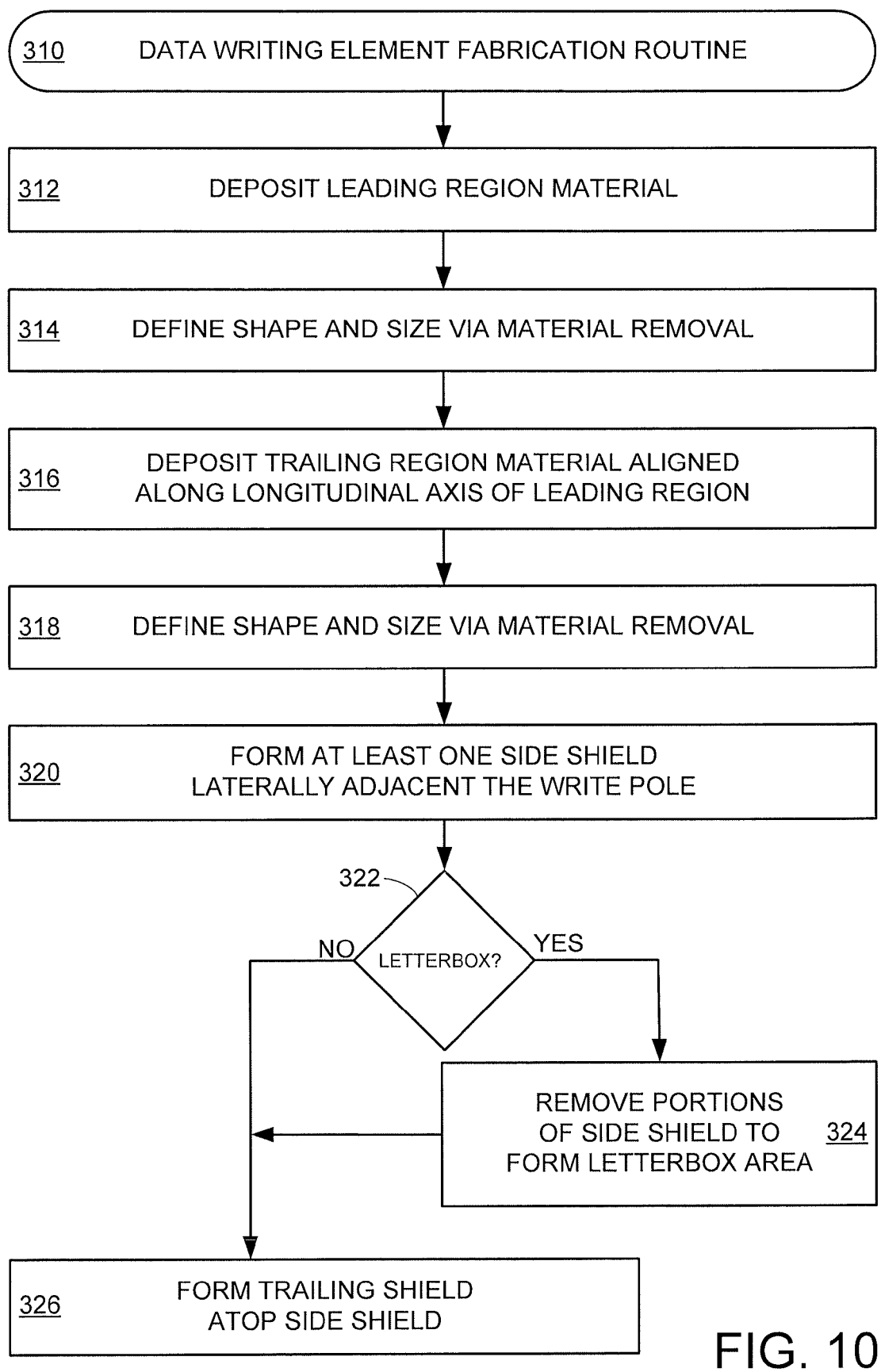
FIG. 10 provides a flowchart of an example data writing element fabrication routine in accordance with various embodiments.

While the various magnetic performance aspects of a write pole may be constructed in an unlimited variety of manners, FIG. 10 provides a flowchart of an example data writing fabrication routine 310 carried out in accordance with some embodiments to provide predetermined write pole performance. While it is contemplated that a write pole can be deposited and tuned in various steps, such as concurrently depositing and shaping the leading and trailing regions, assorted embodiments initially conduct step 312 to deposit the leading region of a selected material that has a predetermined magnetic moment. Step 312 can be carried out in a single and consecutive stages that produce a leading region with an unlimited size and shape that is subsequently tuned to a predetermined shape and size in step 314 via material removal, such as polishing and etching.

As a result of the material removal of step 314, the leading region can have a substantial shape and size with sidewalls angled at predetermined angles with respect to the longitudinal axis of the leading region and leading and trailing edges that respectively have predetermined widths. The trailing edge of the leading region may be further processed, in some embodiments, to have a predetermined texture, such as through the formation of a seed layer, conducive to the deposition and growth of the trailing region in step 316 with a predetermined magnetic moment material and aligned along the longitudinal axis of the leading region. Much like the tuned shaping of the leading region in step 314, the trailing region can undergo material removal to define a predetermined shape and size in step 318. It is noted that step 318 can produce an asymmetric write pole configuration, like write pole 240 of FIG. 7, as well as a symmetric write pole configuration, like write pole 240 of FIG. 6, with projections laterally extending from the leading region a predetermined width that defines a non-magnetic separation distance from at least one side shield deposited in step 320.

Various embodiments utilize step 320 to form a side shield on opposite lateral sides of the write pole to form a symmetric shielding configuration about the longitudinal axis of the write pole. The tuned shapes of each side shield can complement the tuned shape and size of the leading and trailing regions of the write pole to control how and where magnetic flux flows through the write pole at the ABS both during and after a data bit programming operation. The side shields can be tuned with a taper angle that brings the trailing region of the write pole in closer proximity to the side shields than the leading region, as shown in FIGS. 4 and 5. The side shields may further be tuned with a letterbox area of non-magnetic material downtrack from the trailing region of the write pole to direct magnetic flux towards the trailing shield.

Decision 322 evaluates and determines if a letterbox area is to be installed in the data writing element formed in routine 310. If a letterbox area is chosen, step 324 proceeds to remove magnetic material of at least one side shield to form a rectangular, square, or curvilinear notch that is subsequently filled with non-magnetic material before step 326 forms a trailing shield atop the side shields and non-magnetic material. As discussed above, the letterbox area can be tuned for size and shape to balance magnetic shunting and shielding between the side shields and write pole, which can aid in directing magnetic flux towards the trailing shield and reducing the risk of flux inadvertently being trapped within portions of the write pole after a data writing operation.

Whether a letterbox area is not chosen in decision 322 or is a letterbox area is formed in one, or both, side shields in step 324, 326 deposits magnetic shielding material in one or more layers atop the write pole and side shields to form a trailing shield downtrack from the write pole. The trailing shield can be tuned, in some embodiments, to be a uniform or varying distance from the trailing edge of the trailing region of the write pole to promote or restrict magnetic shunting of flux into the trailing shield.

Through the various steps and decisions of routine 310, a data writing element can be constructed with tuned magnetic shielding and performance. It should be noted, however, that the various steps and decisions of routine 310 shown in FIG. 10 is not required or limited as the various decisions and steps can be omitted, changed, and added. As an example, at least one additional step can deposit non-magnetic insulating material to continuously contact and surround the write pole while separating the write pole from formed, or yet to be formed, magnetic shields.

With the diverse tuning capabilities for the various aspect of a data writing element, magnetic performance of the write pole can be catered to provide a precise magnetic extent while reducing the risk of residual magnetic flux being present at the ABS after a data writing operation. The ability to tune a write pole with a substantially T-shape can redistribute magnetic flux flow towards the trailing shield to reduce magnetic transition curvature and variations of on-track magnetic field gradient in the cross-track direction to optimize PW50 and magnetic transitions between writing and non-writing states. Additionally, tuning the magnetic materials of the leading and trailing regions to have different magnetic moments can control the erasure band and magnetic extent of the write pole to minimize ATI and EAW, especially at high skew angles found in reduced form factor, high data track density data storage environments.

It should be noted that while the embodiments herein have been directed to magnetic programming, the claimed technology can readily be utilized in any number of other applications, including data bit sensing applications. It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a write pole comprising leading and trailing regions on an air bearing surface (ABS), the leading region having a leading width measured between first and second pole sidewalls on the ABS, the leading region connected to the trailing region via a transition feature to form a substantially T-shaped cross-section on the ABS, the trailing region having a trailing width measured from a third pole sidewall across first and second protrusions to a fourth pole sidewall of the write pole.

2. The apparatus of claim 1, wherein each protrusion is cantilevered from the leading region.

3. The apparatus of claim 1, wherein the write pole is symmetrical about a longitudinal axis of the write pole.

4. The apparatus of claim 1, wherein the leading width is less than the trailing width.

5. The apparatus of claim 1, wherein a trailing edge of the write pole continuously extends between the third and fourth sidewalls.

6. The apparatus of claim 1, wherein the first and third sidewalls each angled at a first angle with respect to a longitudinal axis of the write pole, the second and fourth sidewalls each angled at a second angle with respect to the longitudinal axis.

7. The apparatus of claim 1, wherein the transition feature comprises a right angle.

8. The apparatus of claim 1, wherein the leading region comprises a leading edge oriented parallel to a trailing edge of the trailing region.

9. The apparatus of claim 1, wherein the leading and trailing widths are configured with a 1:2, 3:4, or 1:4 ratio.

10. The apparatus of claim 1, wherein the write pole is asymmetric about a longitudinal axis of the write pole.

11. A magnetic element comprising a write pole comprising leading and trailing regions on an air bearing surface (ABS), the leading region having a trailing width connected to a leading width of the trailing region via a transition feature comprising a projection to form a substantially T-shaped cross-section on the ABS, the leading region defined by first and second sidewalls, the trailing region defined by third and fourth sidewalls, the transition feature separating the first and third sidewalls with a transition surface having a predetermined length from a longitudinal axis of the write pole.

12. The magnetic element of claim 11, wherein a box shield comprises a transition surface extending directly away from the write pole at a point intermediate of the leading and trailing edges.

13. The magnetic element of claim 12, wherein the box shield comprises a downtrack portion shaped about the leading edge.

14. The magnetic element of claim 13, wherein the downtrack portion comprises continuously curvilinear sidewalls.

15. The magnetic element of claim 13, wherein the downtrack portion comprises linear sidewalls.

16. The magnetic element of claim 13, wherein the downtrack portion has a downtrack separation distance greater than the second separation distance.

17. The magnetic element of claim 12, wherein the box shield comprises a negatively angled side shield sidewall between the leading and trailing edges.

18. An apparatus comprising a write pole disposed between and separated from first and second side shields, the write pole comprising leading and trailing regions on an air bearing surface (ABS), the leading region having a leading width measured between first and second pole sidewalls on the ABS, the leading region connected to the trailing region via a transition feature to form a substantially T-shaped cross-section on the ABS, the trailing region having a trailing width measured from a third pole sidewall across first and second protrusions to a fourth pole sidewall of the write pole.

19. The apparatus of claim 18, wherein the first and second side shields each have a non-magnetic notch defining a letterbox region continuously extending downtrack from the trailing region.

20. The apparatus of claim 18, wherein the third sidewall is angled to match a first shield sidewall of the first side shield and the fourth sidewall is angled to match a second shield sidewall of the second side shield.

* * * * *